(12) United States Patent
Parsons et al.

(10) Patent No.: US 7,200,538 B2
(45) Date of Patent: Apr. 3, 2007

(54) METHODS AND APPARATUS FOR MODELING GAS TURBINE ENGINES

(75) Inventors: Franklin D. Parsons, Cincinnati, OH (US); Thomas M. Moynihan, West Chester, OH (US); Kattalaicheri S. Venkataramani, West Chester, OH (US)

(73) Assignee: General Electric Company, Schenectady, NY (US)

( * ) Notice: Subject to any disclaimer, the term of this patent is extended or adjusted under 35 U.S.C. 154(b) by 765 days.

(21) Appl. No.: 10/342,931

(22) Filed: Jan. 15, 2003

(65) Prior Publication Data

US 2006/0282242 A1 Dec. 14, 2006

(51) Int. Cl.
*G06F 9/455* (2006.01)

(52) U.S. Cl. .............. 703/7; 60/225; 60/204; 60/776; 60/770; 415/116

(58) Field of Classification Search .............. 703/7; 60/225, 204, 776, 645, 770, 778, 39.39; 415/116, 415/1; 123/27
See application file for complete search history.

(56) References Cited

U.S. PATENT DOCUMENTS

| | | |
|---|---|---|
| 2,635,420 A | 4/1953 | Jonker |
| 4,215,412 A | 7/1980 | Bernier et al. |
| 5,080,496 A | 1/1992 | Keim et al. |
| 5,353,588 A | 10/1994 | Richard |
| 5,489,829 A | 2/1996 | Umida |
| 5,513,489 A | 5/1996 | Bussing |
| 5,689,066 A | 11/1997 | Stevenson |
| 5,694,768 A | 12/1997 | Johnson et al. |
| 5,726,891 A | 3/1998 | Sisson et al. |
| 5,873,240 A | 2/1999 | Bussing et al. |
| 6,477,829 B1* | 11/2002 | Hunter et al. .............. 60/225 |
| 2002/0139106 A1* | 10/2002 | Meholic .............. 60/39.39 |
| 2002/0150471 A1* | 10/2002 | Liu et al. .............. 415/116 |
| 2002/0177985 A1* | 11/2002 | Kraft et al. .............. 703/7 |
| 2003/0000221 A1* | 1/2003 | Anderson .............. 60/776 |
| 2003/0077163 A1* | 4/2003 | Eveker et al. .............. 415/1 |
| 2003/0136356 A1* | 7/2003 | Namkung .............. 123/27 R |
| 2003/0205042 A1* | 11/2003 | Walker et al. .............. 60/204 |
| 2004/0045300 A1* | 3/2004 | Dovali-Solis .............. 60/778 |
| 2004/0050064 A1* | 3/2004 | Segota et al. .............. 60/770 |

(Continued)

FOREIGN PATENT DOCUMENTS

DE 2046079 9/1970

(Continued)

OTHER PUBLICATIONS

Schauer et al., "Detonation initiation studies and performance results for pulsed detonation engine applications", 39th AIAA Aerospace sciences Meeting & Exhibit, Jan. 2001.*

(Continued)

*Primary Examiner*—Kandasamy Thangavelu
(74) *Attorney, Agent, or Firm*—William Scott Andes; Armstrong Teasdale LLP

(57) ABSTRACT

A method enables modeling of a gas turbine engine that includes a pulse detonation system. The method includes providing a pulse detonation modeling system, predicting characteristics of the engine using the pulse detonation modeling system, and predicting characteristics of the pulse detonation system using the pulse detonation modeling system.

18 Claims, 7 Drawing Sheets

U.S. PATENT DOCUMENTS

2004/0083731 A1* 5/2004 Lasker .................. 60/645

FOREIGN PATENT DOCUMENTS

EP 0858017 A2 8/1998
WO CH87/00054 11/1987

OTHER PUBLICATIONS

Chao et al., "On the design of pulse detonation engines", California Institute of Technology, Jan. 2001.*

Katta et al., "Numerical studies on Cellular detonation wave subjected to sudd expansion", Wright Patterson Air Force Base, 1999.*

Rolling et al., "Propagation of detonation waves in tubes split from a PDE thrust tube", 38th AIAA/ASME/SAE/ASEE Joint propulsion conference, Jul. 2002.*

Pegg et al., "Pulse detonation engine air induction system analysis", AIAA, 1996.*

Guzik et al., "An investigation of pulse detonation engine configurations using the method of characteristics", AIAA, 2002.*

* cited by examiner

METHODS AND APPARATUS FOR MODELING GAS TURBINE ENGINES

BACKGROUND OF THE INVENTION

This invention relates generally to gas turbine engines and more specifically, to a method and apparatus for modeling a gas turbine engine that includes a pulse detonation system.

At least some known pulse detonation systems use a series of repetitive detonations within a detonation chamber to produce a high pressure exhaust. More specifically, a fuel and air mixture is periodically detonated within a plurality of tubes, or other geometric configurations, such as an annular chamber, positioned within the detonation chamber to cause a strong shock wave to propagate at supersonic speeds through the unburned fuel-air mixture. The passage of the strong shock wave causes a mode of combustion, known as detonation, to occur behind, and closely coupled to, the strong shock wave, a condition herein referred to as the detonation wave or the detonation front. More specifically, the detonation wave increases the temperature and pressure within the combustion gases. The products of combustion exit the tube or annular chamber at an elevated pressure and temperature, and at a high velocity. The pressure, temperature, and velocity of the gases exiting the detonation chamber are higher than would be obtained with conventional gas turbine combustion.

At least some known pulse detonation systems are used as a core engine system for a gas turbine engine. Other known pulse detonation systems are used to augment conventional gas turbine engines. More specifically, a conventional gas turbine engine may include a core engine system that typically includes in serial, axial flow relationship, a compressor, a combustor, a high pressure turbine, and a low pressure turbine. Some known pulse detonation systems are positioned downstream from the core engine system to facilitate increasing thrust by providing additional energy to exhaust airflow exiting the core engine system and a bypass duct surrounding the core engine.

Known methods for modeling pulse detonation system performance and design characteristics include determining time-stepped solutions for a particular pulse detonation system. However, such methods only model the pulse detonation system, and may not obtain additional data regarding operating conditions within the system for a plurality of flight conditions.

BRIEF SUMMARY OF THE INVENTION

In one aspect, a method is provided for modeling a gas turbine engine that includes a pulse detonation system. The method includes providing a pulse detonation modeling system, predicting characteristics of the engine using the pulse detonation modeling system, and predicting characteristics of the pulse detonation system using the pulse detonation modeling system.

In another aspect of the invention, a modeling system is provided for use in modeling a gas turbine engine that includes a pulse detonation system. The modeling system includes a computer including a processor, and at least one database that is coupled to the computer. The processor is programmed to predict characteristics of the pulse detonation system, and to predict characteristics of the gas turbine engine using the predicted characteristics of the pulse detonation system for engine cycle design and off-design performance mapping.

DETAILED DESCRIPTION OF THE INVENTION

As used herein, the term "design characteristics" may include any characteristic or specification used in defining the design of a pulse detonation system or gas turbine engine. For example, "design characteristics" may include the geometry of a component within a pulse detonation system or gas turbine engine, or the size, weight, or strength of a pulse detonation system component, a gas turbine engine component, a pulse detonation system generally, or a gas turbine engine generally. The above examples are exemplary only, and are thus not intended to limit in any way the definition and/or meaning of the term "design characteristics". As used herein, the term "performance characteristics" may include anything defining the performance of a pulse detonation system or gas turbine engine. For example, "performance characteristics" may include the thrust to weight ratio of a pulse detonation system or a gas turbine engine. The above example is exemplary only, and is thus not intended to limit in any way the definition and/or meaning of the term "performance characteristics".

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". Furthermore, although the invention is described herein in association with a pulse detonation engine, and more specifically for use with a pulse detonation system used as a core engine system for a gas turbine engine, it should be understood that the present invention is applicable to any pulse detonation system used as an augmentor for a gas turbine engine. Accordingly, practice of the present invention is not limited to a pulse detonation system used as a core engine system for a gas turbine engines.

Figure 1:
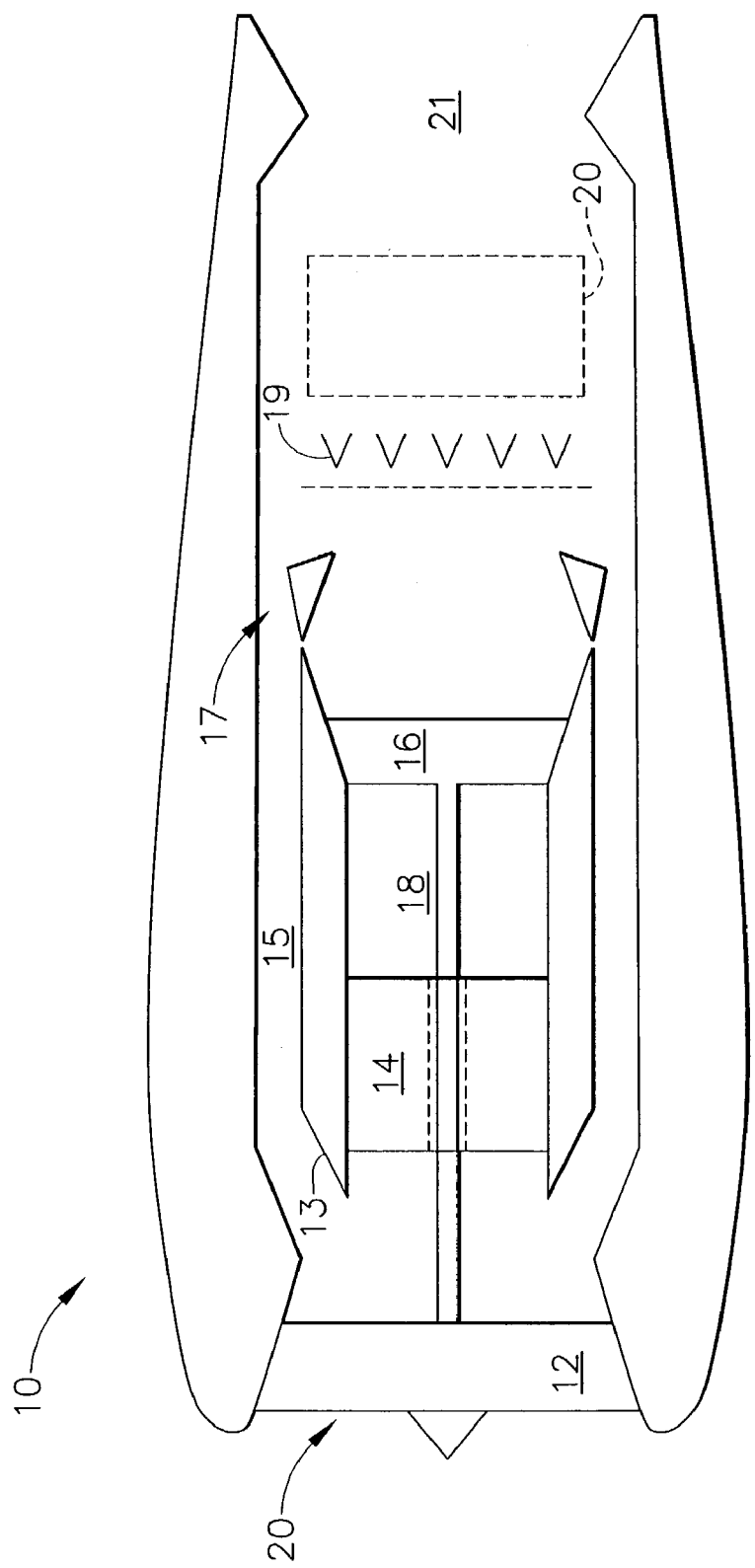
FIG. 1 is a schematic illustration of an exemplary gas turbine engine.

FIG. 1 is a schematic illustration of a mixed flow augmented turbo-fan engine 10 including a low pressure fan 12, a pulse detonation engine 14, and a turbine 16. Fan 12 and turbine 16 are coupled by a shaft 18. In one embodiment, engine 10 is a F110/129 engine available from General Electric Aircraft Engines, Cincinnati, Ohio.

In operation, air flows through fan 12 from an inlet side 20 of engine 10 to a splitter 13 which directs a portion of flow towards pulse detonation engine 14 and remaining flow towards a bypass duct 15. Fluid flow through engine 14 powers turbine 16 which powers fan 12 through shaft 18. Gases from turbine 16 mix with fan duct bypass air at a mixer 17 and either pass through a conventional augmentor 19, or alternatively, through a pulse detonation augmentor 20 before being discharged through a nozzle 21.

Figure 2:
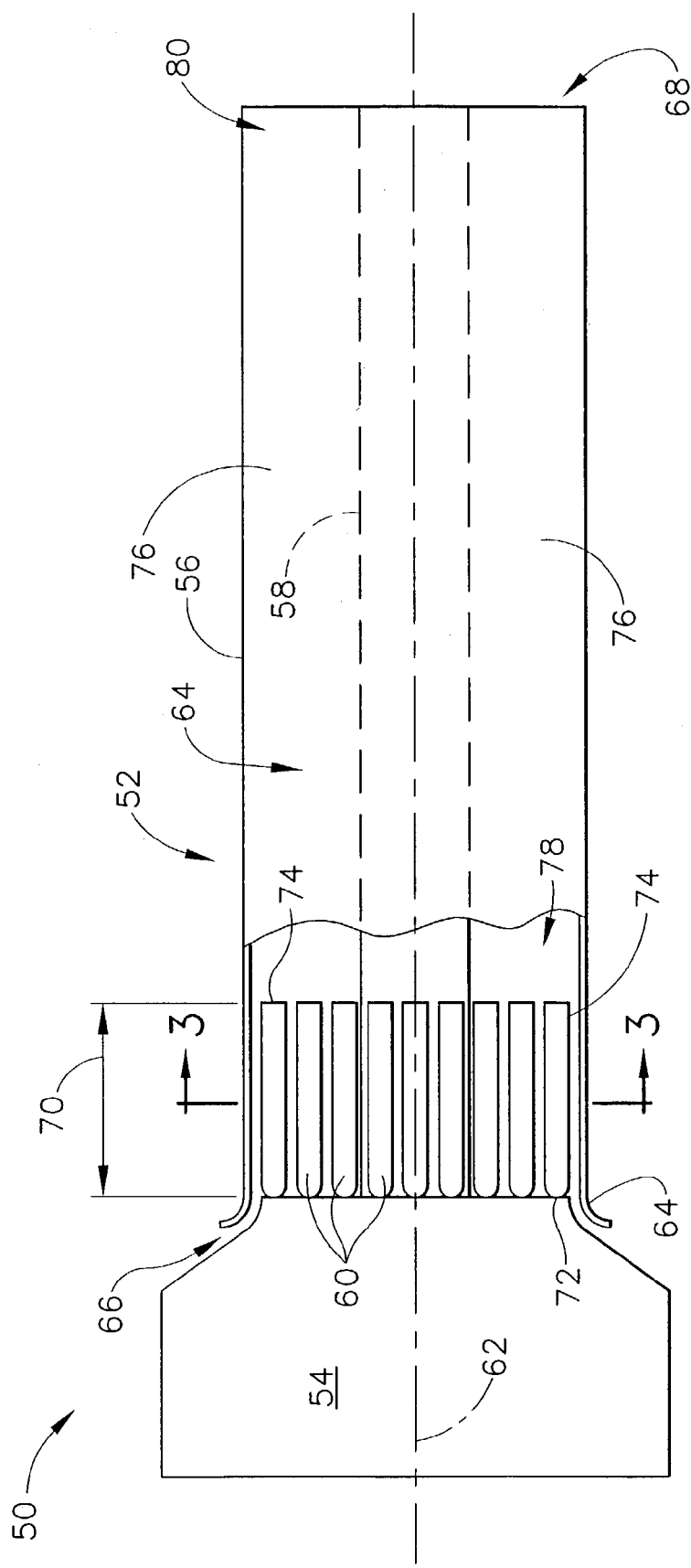
FIG. 2 is a schematic illustration of an exemplary pulse detonation system for use with a gas turbine engine, such as the gas turbine engine shown in FIG. 1.
Figure 3:
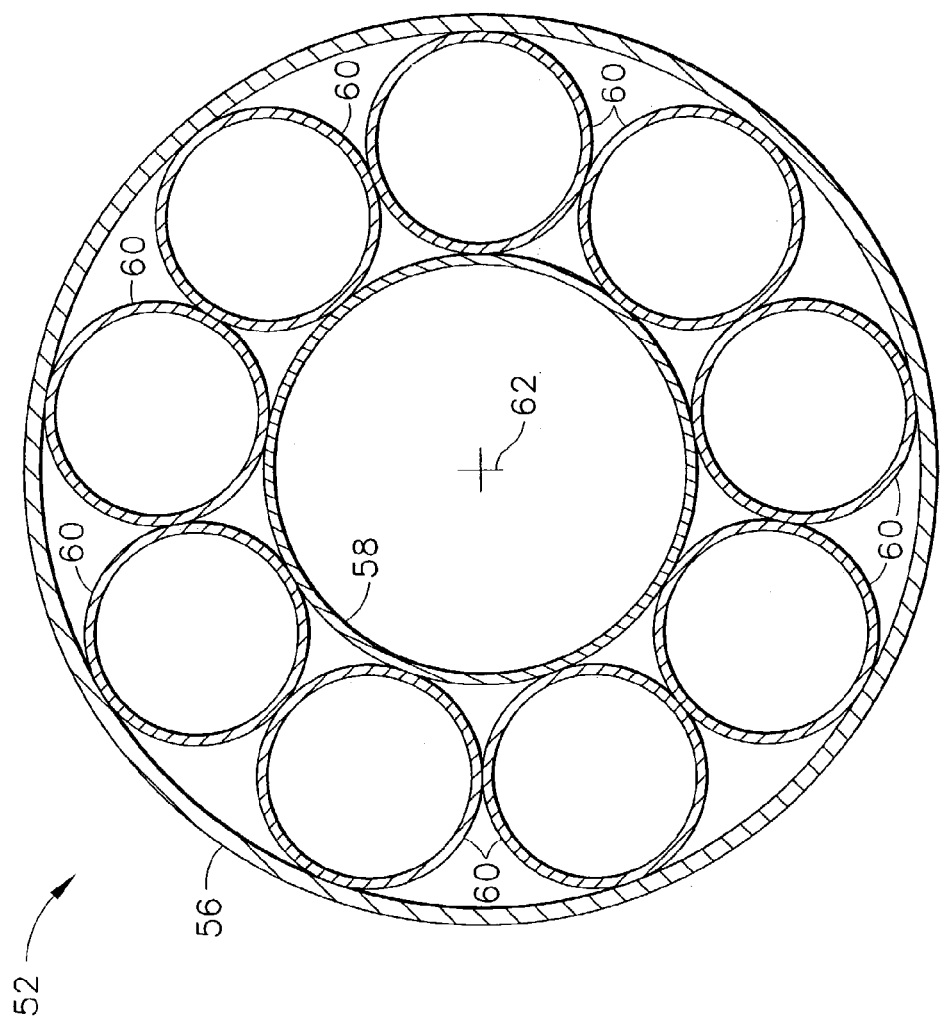
FIG. 3 is a cross-sectional view of a portion of an exemplary detonator used with the detonation system shown in FIG. 2 and taken alone line 3—3.

FIG. 2 is a schematic illustration of an exemplary pulse detonation system 50 for use with a gas turbine engine, for example engine 10 (shown in FIG. 1). FIG. 3 is a cross-sectional view of a portion of a detonator 52 and taken alone line 3—3. Pulse detonation system 50 includes a pulse detonator 52 and a firing sub-system 54. Pulse detonator 52 includes annular outer and inner casings 56 and 58, respectively, and a plurality of detonation tubes 60. Outer and inner casings 56 and 58, respectively, are disposed substantially coaxially about a longitudinal centerline axis 62 of pulse detonation system 50. More specifically, outer and inner casings 56 and 58 are spaced a radial distance apart such that a detonation chamber 64 is defined therebetween.

Pulse detonation chamber 64 includes an inlet end 66 and an outlet end 68. Detonation tubes 60 are routed through detonation chamber 64 along axis 62. Detonation tubes extend a length 70 measured from an upstream end 72 adjacent inlet end 66, to a downstream end 74 that is adjacent an exhaust chamber 76. More specifically, exhaust chamber 76 is defined between a downstream end 74 of detonation tubes 60 and pulse detonation chamber outlet end 68. Accordingly, exhaust chamber 76 also has an upstream end 78 and a downstream end 80.

In the exemplary embodiment, detonation tubes 60 extend through detonation chamber 64 such that a plurality of tubes 60 are spaced circumferentially around axis 62. In addition, in the exemplary embodiment, detonation tubes 60 each have a substantially circular cross-sectional geometric shape. However, it should be understood that the number, geometric shape, configuration, length and/or diameter of each tube 60 will vary depending upon the particular application of system 50.

Firing sub-system 54 is coupled to detonation tubes 60 adjacent upstream ends 72. Firing sub-system 54 charges each tube 60 with air and fuel, and periodically detonates the mixture of fuel and air within each tube 60 to produce combustion gases within each tube 60 and exhaust chamber 76. More specifically, firing sub-system 54 charges each detonation tube 60 with fuel, from a fuel source (not shown), and air from low pressure fan 12 (shown in FIG. 1). The fuel-air mixture is detonated to produce combustion gases within each tube 60 that are channeled downstream through exhaust chamber 76 and are discharged from detonation chamber outlet end 68 towards engine outlet 22 (shown in FIG. 1). In one embodiment, air and fuel are mixed by firing sub-system 54 before the mixture is supplied to each detonation tube 60. In an alternative embodiment, air and fuel are independently supplied to each detonation tube 60 and are mixed within each detonation tube 60.

Firing sub-system 54 does not continuously detonate the mixture within tubes 60, but rather, firing sub-system 54 periodically cycles the detonation of the fuel/air mixture to generate pressure waves, or pulses, that propagate through the combustion gases. More specifically, the pressure waves facilitate increasing the pressure and temperature of the combustion gases, such that thrust is produced by pulse detonation system 50. The pressure waves propagate downstream through tubes 60 and exhaust chamber 76.

Figure 4:
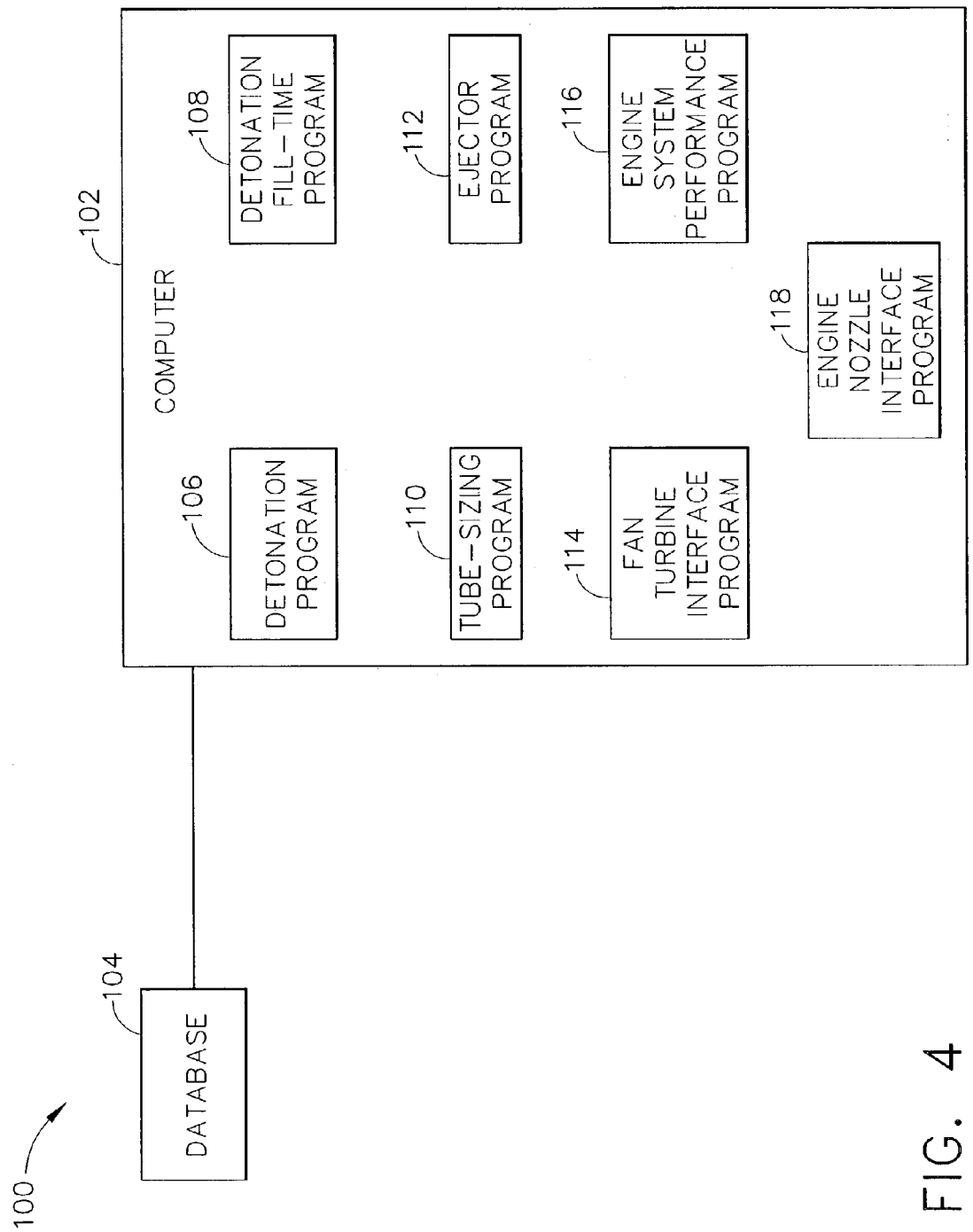
FIG. 4 is a schematic view of an exemplary modeling system for modeling performance and design characteristics of a gas turbine engine that includes a pulse detonation system, such as the gas turbine engine shown in FIG. 1.

FIG. 4 is a schematic view of an exemplary modeling system 100 for modeling performance and design characteristics of a gas turbine engine that includes a pulse detonation system, such as engine 10 (shown in FIG. 1). Modeling system 100 is configured for use in conjunction with a steady-state gas turbine engine modeling system (not shown). Steady-state gas turbine engine modeling systems are known in the art. Modeling system 100 includes at least one computer 102 that includes a processor, and at least one database 104. In one embodiment, the steady-state gas turbine engine modeling system is embedded within computer 102. In an alternative embodiment, the steady-state gas turbine engine modeling system is stored separately from computer 102, and is electrically accessible by computer 102. Database 104 includes a plurality of thermodynamic properties for a plurality of combustion gases. In an alternative embodiment, database 104 is stored remotely from computer 102, and is rather electrically accessible by computer 102.

Computer 102 includes a plurality of modeling software, herein referred to as subroutines. More specifically, computer 102 includes a detonation program 106, a detonation fill-time subroutine 108, a tube-sizing program 110, an ejector subroutine 112, and a fan turbine interface program 114. An engine system performance subroutine 116 and an engine nozzle interface subroutine 118 are also accessible by computer 102. In an alternative embodiment, modeling system 100 is configured to model a pulse detonation system (not shown) that is used to augment a conventional gas turbine engine (not shown), and as such modeling system 100 may not include turbine interface subroutine 114. Although computer 102 is herein described and illustrated as containing subroutines 106–118, it will be understood that subroutines 106–118 may be contained and executed on any number of computers, either separately or in combination with one or more other programs 106–118.

Figure 5:
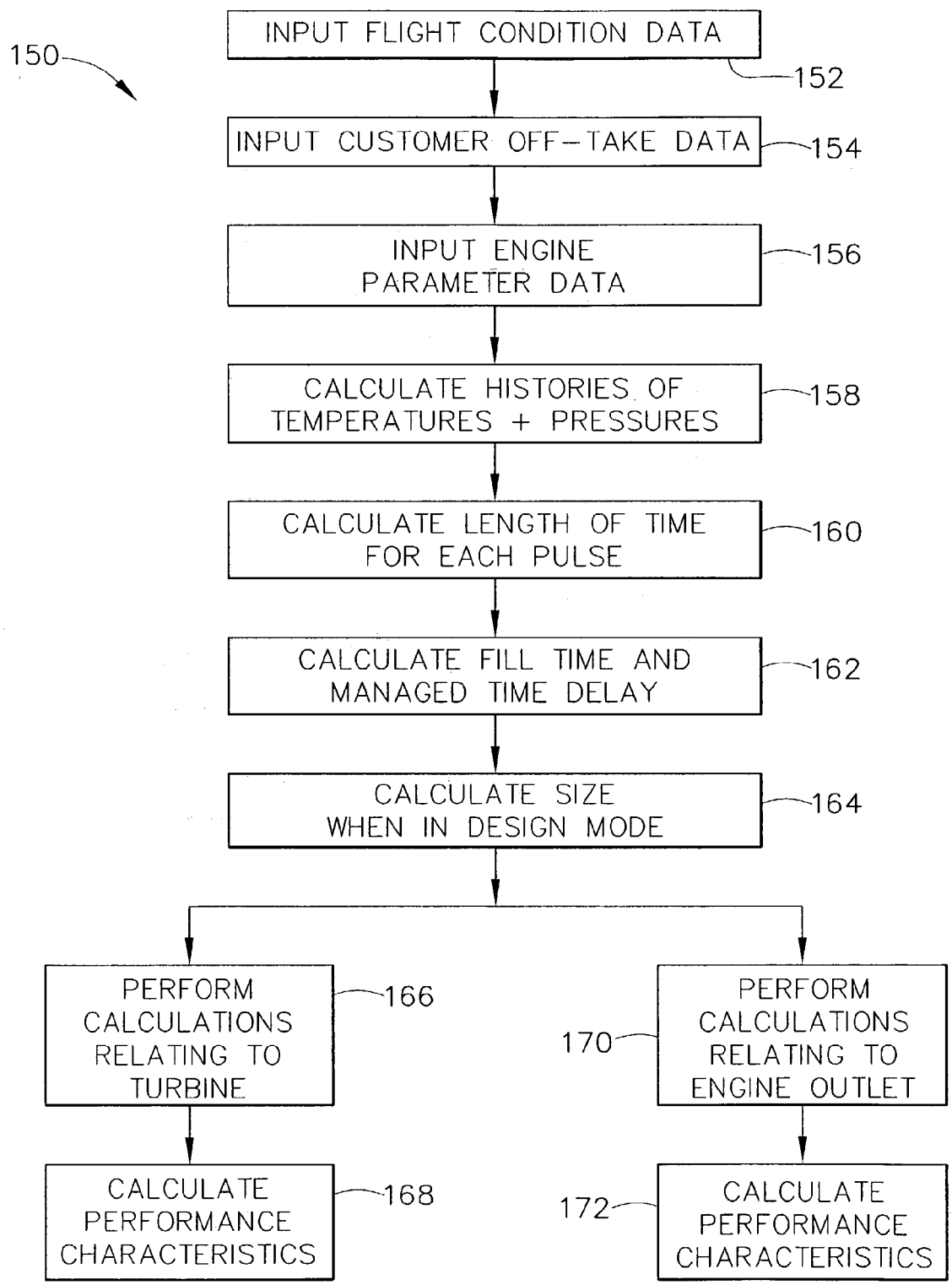
FIG. 5 is a flowchart illustrating a method for modeling performance and design characteristics of a gas turbine engine that includes a pulse detonation system, such as the gas turbine engine shown in FIG. 1, using the modeling system shown in FIG. 4.

FIG. 5 is a flowchart illustrating a method 150 for modeling performance and design characteristics of a gas turbine engine including a pulse detonation system, such as engine 10 (shown in FIG. 1), using modeling system 100 (shown in FIG. 4). Although modeling system 100 and method 150 are discussed herein with specific reference to engine 10 and particular components within engine 10, it should be understood that modeling system 100 and method 150 are used for predicting performance and design characteristics of gas turbine engines that include pulse detonation systems, and as such, system 100 is not limited to use with only engine 10. More specifically, references to engine 10, and particular components of engine 10, within the discussion and illustrations herein are intended to be only exemplary of the operation and components of a gas turbine engine that includes a pulse detonation system.

Initially, flight condition data is input 152 to computer 102 from the steady-state gas turbine engine modeling system (not shown). Customer off-take data from the steady-state gas turbine engine modeling system is also input 154 to computer 102. In one embodiment, flight condition data includes data gathered from a plurality of engine sensors, including, but not limited to a temperature, a pressure, and a flowrate of ambient air into low pressure fan 12 (shown in FIG. 1). In one embodiment, flight condition data includes altitude, flight Mach number, deviation from standard atmospheric temperature, and engine power settings. In addition, in one embodiment, customer off-take data includes, but is not limited to, a desired size and weight for engine 10. Additional customer off-take data may include, but is not limited to, bleed air used for environmental control systems, anti-ice systems, and other airframe systems, and/or horse power extraction necessary to power airframe accessories. Engine parameter data is then input 156 to computer 102 from the steady-state gas turbine engine modeling system. Engine parameter data includes, but is not limited to, a temperature, a pressure, and a flowrate of air exiting low pressure fan 12 (shown in FIG. 1). In an alternative embodiment, wherein pulse detonation system 50 (shown in FIG. 2) is used to augment a conventional gas turbine engine (not shown), engine parameter data also includes a pressure, a temperature, and a flowrate of combustion gases exiting a conventional core engine system (not shown) and mixed with any bypass air from the fan, if applicable and used with gas turbine engine 10.

Using the engine parameter data, detonation program 106 calculates 158 the history, or evolution in time and space from an instant and location of the initiation of detonation, of temperatures and pressures generated within detonation tubes 60 and detonation chamber 64 (shown in FIGS. 2 and 3) during pulsing of engine 10. A length of time for each pulse within tubes 60 and chamber 64 is then calculated 158. More specifically, using the calculated histories of temperatures and pressures, detonation subroutine 106 determines 160 an amount of time that elapsed between the detonation of a pulse and a return of pressure within tubes 60 to a pressure that existed within tubes 60 before detonation.

Using thermodynamic properties of gases stored within database 104, detonation fill-time subroutine 108 determines 162 a fill time for tubes 60 for each pulse. More specifically, for each pulse, subroutine 108 calculates 162 a length of time necessary to fill tubes 60 with fuel and air prior to detonation, and tube-sizing subroutine 110 determines 164 a desired size of detonation tubes 60, accounting for any managed time delays. In one embodiment, tube-sizing subroutine 110 calculates 164 a desired length for each detonation tube 60. In another embodiment, tube-sizing subroutine 110 calculates 164 a desired diameter for each detonation tube 60.

In the exemplary embodiment, through fan turbine interface subroutine 114, processor 102 uses the calculated fill time, the calculated size of tubes 60, and the calculated length of time for each pulse, to execute 166 calculations relating to turbine 16 (shown in FIG. 1). Using the pressure-time-space shape of the detonation pulse, and any managed time delay, the appropriate subroutine calculates an average pressure and corresponding gas properties which are then treated as steady state properties and input to the appropriate turbine subroutines as in a conventional gas turbine. Subroutine 116 receives the inputs, and using internally-stored relationships between various engine parameters, iterates until engine requirements are met. Using engine system performance subroutine 116, performance characteristics for engine 10 are calculated 168 using calculations relating to turbine 16.

In an alternative embodiment, wherein pulse detonation system 50 is used to augment a conventional gas turbine engine, calculations relating to engine outlet 22 (shown in FIG. 1) are determined 170 using the engine nozzle interface subroutine and in reliance on the calculated fill time, the calculated size of tubes 60, and the calculated length of time for each pulse. Performance characteristics for engine 10 are then calculated 172 by engine system performance subroutine 116 using the calculations relating to engine outlet 22.

In one embodiment, method 150 facilitates predicting a desired size of a gas turbine engine that includes a pulse detonation system to achieve predetermined performance characteristics and predetermined flight condition data. In another embodiment, method 150 facilitates predicting a weight of a gas turbine engine that includes a pulse detonation system to achieve predetermined performance characteristics and predetermined flight conditions. In yet another embodiment, method 150 facilitates predicting performance characteristics of a gas turbine engine that includes a pulse detonation system to achieve a predetermined engine size and weight, and predetermined flight conditions. In a further embodiment, method 150 facilitates obtaining data regarding operating conditions within pulse detonation systems for a plurality of flight conditions to enable cycle design and off-design performance mapping.

Figure 6:
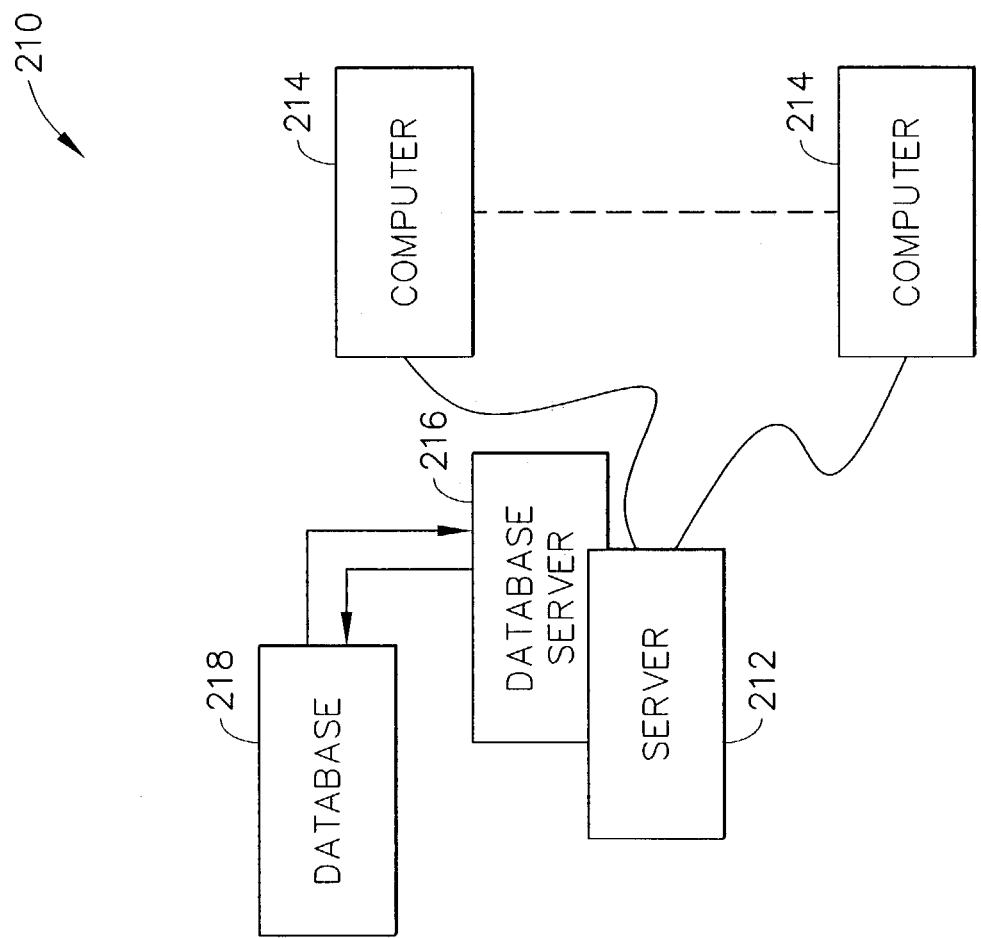
FIG. 6 is an exemplary system block diagram of an alternative embodiment of a modeling system that may be used to implement the method shown in FIG. 4.

FIG. 6 is an exemplary system block diagram of an alternative embodiment of a modeling system 200 that may be used to implement the method shown in FIG. 5, to facilitate, for example, the efficient and cost-effective design of gas turbine engines that include pulse detonation systems. System 200 includes a server 212 and a plurality of devices 214 connected to server 212. In one embodiment, devices 214 are computers including a web browser, and server 212 is accessible to devices 214 via the Internet. In an alternative embodiment, devices 214 are servers for a network of customer devices. System 210 is coupled to a mass storage device (not shown). In the exemplary embodiment, server 212 includes a database server 216 coupled to a centralized database 218.

Devices 214 are interconnected to the Internet through many interfaces including through a network, such as a local area network (LAN) or a wide area network (WAN), through dial-in-connections, cable modems and special high-speed ISDN lines. Alternatively, devices 214 could be any device capable of interconnecting to the Internet including a web-based phone or other web-based connectable equipment. A database providing information relating to the plurality of plants is stored on server 212 and can be accessed by users at one of devices 214 by logging onto server 212 through one of devices 214.

System 210 is configured to provide various user interfaces whereby users access operational data from equipment monitored at the plurality of plants. Server 212 accesses stored information and downloads the requested operational data to at least one of the client systems 214, when the request to download is received from client system 214. The databases are accessed by users using client system 214 configured with a standard web browser.

Figure 7:
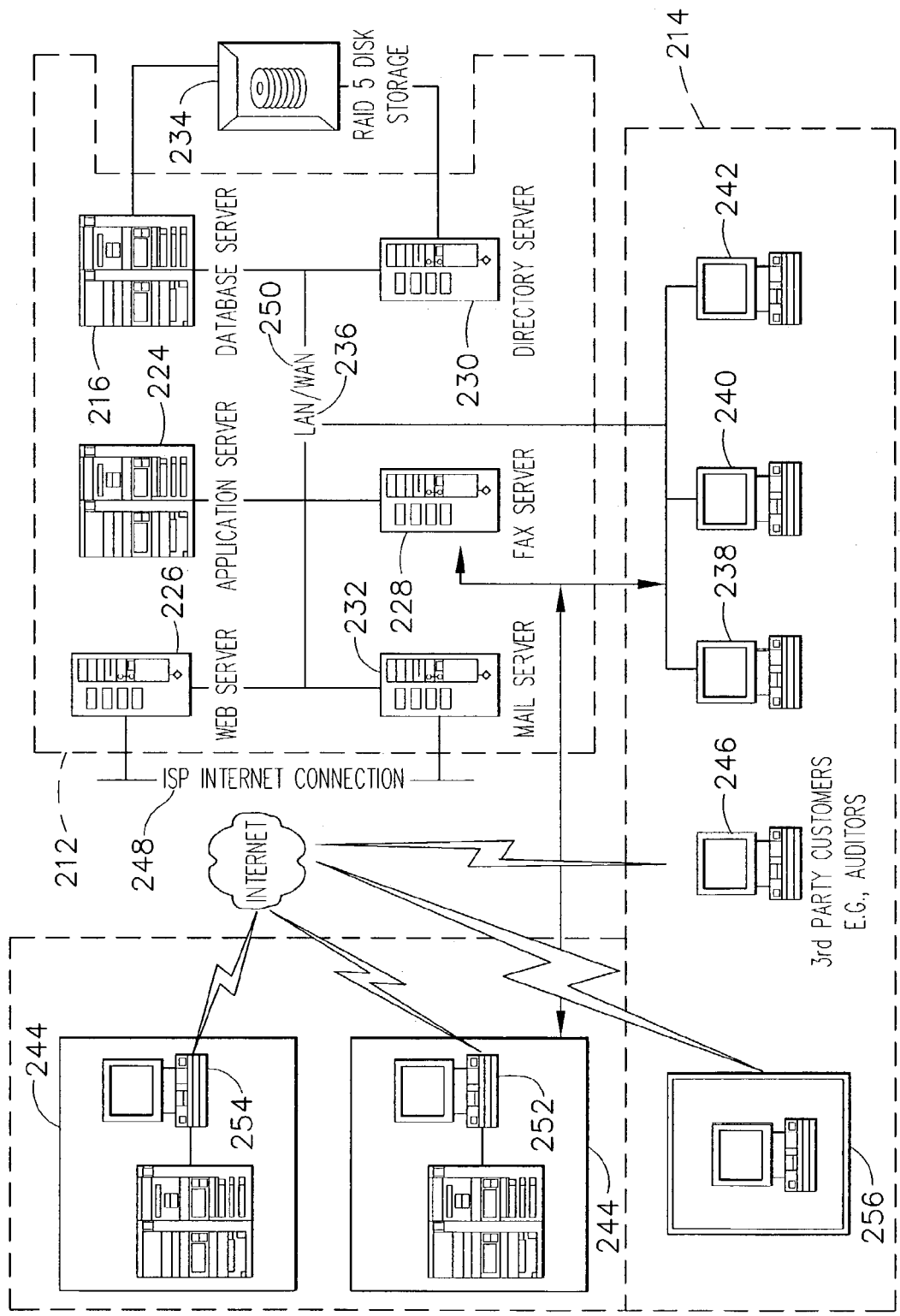
FIG. 7 is an expanded version block diagram of a server architecture that may be used with the gas turbine engine modeling system shown in FIG. 6.

FIG. 7 is an expanded version block diagram of a server architecture that may be used with the gas turbine engine modeling system 210. System 210 includes server sub-system 212 and user devices 214. Server sub-system 212 includes database server 216, an application server 224, a web server 226, a fax server 228, a directory server 230, and a mail server 232. A disk storage unit 234 is coupled to database server 216 and directory server 230. Servers 216, 224, 226, 228, 230, and 232 are coupled in a local area network (LAN) 236. In addition, a system administrator workstation 238, a user workstation 240, and a supervisor workstation 242 are coupled to LAN 236. Alternatively, workstations 238, 240, and 242 are coupled to LAN 236 via an Internet link or are connected through an intranet.

Each workstation 238, 240, and 242 is a personal computer having a web browser. Although the functions performed at the workstations typically are illustrated as being performed at respective workstations 238, 240, and 242, such functions can be performed at one of many personal computers coupled to LAN 236. Workstations 238, 240, and 242 are illustrated as being associated with separate functions only to facilitate an understanding of the different types of functions that can be performed by individuals having access to LAN 236.

In another embodiment, server sub-system 212 is configured to be communicatively coupled to various individuals or employees 244 and to users 246 via an ISP Internet connection 248. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 250, local area network 236 could be used in place of WAN 250.

In the exemplary embodiment, any authorized individual or an employee of the business entity having a workstation 252 can access server sub-system 212. One of user devices 214 includes a senior manager's workstation 254 located at a remote location. Workstations 252 and 254 are personal computers having a web browser. Also, workstations 252 and 254 are configured to communicate with server sub-system 212. Furthermore, fax server 228 communicates with employees located outside the business entity and any of the remotely located user systems, including a user system 256 via a telephone link. Fax server 228 is configured to communicate with other workstations 238, 240, and 242 as well.

The above-described modeling system facilitates predicting performance and design characteristics for gas turbine engines that include pulse detonation systems. More specifically, the modeling system predicts performance and design characteristics for both cycle-design and off-design performance mapping. As a result, the above-described modeling system facilitates efficient and cost-effective design of gas turbine engines that include pulse detonation systems.

Exemplary embodiments of modeling systems are described above in detail. The systems are not limited to the specific embodiments described herein, but rather, components of each system may be utilized independently and separately from other components described herein. Each modeling system component can also be used in combination with modeling system components.

While the invention has been described in terms of various specific embodiments, those skilled in the art will recognize that the invention can be practiced with modification within the spirit and scope of the claims.

What is claimed is:

1. A method of modeling a gas turbine engine that includes a pulse detonation system including at least one pulse detonation tube, said method comprising:
   providing a pulse detonation modeling system;
   predicting characteristics of the pulse detonation system by calculating at least one of a pulse detonation tube fill time and a pulse detonation tube size using the pulse detonation modeling system; and
   predicting characteristics of the gas turbine engine using the pulse detonation modeling system.

2. A method in accordance with claim 1 wherein predicting characteristics of the gas turbine engine further comprises predicting characteristics of the gas turbine engine for engine cycle design and off-design performance mapping.

3. A method in accordance with claim 1 wherein predicting characteristics of the gas turbine engine comprises predicting characteristics of the gas turbine engine using design characteristics input into the pulse detonation modeling system.

4. A method in accordance with claim 1 wherein predicting characteristics of the gas turbine engine comprises predicting performance characteristics of the gas turbine engine using the pulse detonation modeling system.

5. A method in accordance with claim 1 wherein predicting characteristics of the gas turbine engine comprises inputting at least one of flight condition data, customer off-take data, and engine parameter data into the pulse detonation modeling system.

6. A method in accordance with claim 5 wherein predicting characteristics of the gas turbine engine further comprises calculating at least one of a peak temperature and a pressure history for at least one pulse detonation tube using at least one of the flight condition data, the customer off-take data, and the engine parameter data.

7. A method in accordance with claim 6 wherein predicting characteristics of the gas turbine engine further comprises calculating a length of time for at least one detonation pulse within the pulse detonation system using at least one of the temperature and the pressure history.

8. A method in accordance with claim 7 wherein the gas turbine engine includes at least one turbine, said predicting characteristics of the gas turbine engine further comprising calculating performance characteristics for the gas turbine engine using data and calculations relating to the at least one turbine.

9. A method in accordance with claim 7 wherein the gas turbine engine includes at least one outlet, said predicting characteristics of the gas turbine engine further comprising calculating performance characteristics for the gas turbine engine using data and calculations relating to the at least one outlet and the pulse detonation modeling system.

10. A modeling system for use in modeling a gas turbine engine including a pulse detonation system including at least one pulse detonation tube, said modeling system comprising:
    a computer comprising a processor; and
    at least one database coupled to said computer, said processor programmed to:
    predict characteristics of the pulse detonation system by calculating at least one of a pulse detonation tube fill time and a pulse detonation tube size using said database; and
    predict characteristics of the gas turbine engine using the predicted characteristics of the pulse detonation system for engine cycle design and off-design performance mapping.

11. A modeling system in accordance with claim 10 wherein said processor further programmed to predict at least one of design characteristics and performance characteristics of the pulse detonation system.

12. A modeling system in accordance with claim 10 wherein said processor further programmed to predict characteristics of the gas turbine engine using the design characteristics input into the pulse detonation system.

13. A modeling system in accordance with claim 10 wherein said processor further programmed to predict performance characteristics of the gas turbine engine using the predicted characteristics of the pulse detonation system.

14. A modeling system in accordance with claim 10 wherein said processor further programmed to receive at least one of flight condition data, customer off-take data, and engine parameter data.

15. A modeling system in accordance with claim 14 wherein said processor further programmed to calculate at least one of a temperature and a pressure history for the at least one pulse detonation tube using at least one of the flight condition data, the customer off-take data, and the engine parameter data.

16. A modeling system in accordance with claim 14 wherein said processor further programmed to calculate a length of time for at least one pulse within the pulse detonation system using at least one of the temperature and the pressure history.

17. A modeling system in accordance with claim 16 wherein the gas turbine engine includes at least one turbine, said processor further programmed to calculate performance characteristics for the gas turbine engine using calculations relating to the at least one turbine.

18. A modeling system in accordance with claim 16 wherein the gas turbine engine includes at least one outlet, said processor further programmed to calculate performance characteristics for the gas turbine engine using the calculations relating to the at least one outlet.

* * * * *